United States Patent
Kiple et al.

(10) Patent No.: US 9,600,034 B2
(45) Date of Patent: Mar. 21, 2017

(54) ATTACHING COMPUTING DEVICE TO MOUNT BY MAGNETS

(71) Applicant: GOOGLE INC., Mountain View, CA (US)

(72) Inventors: Bryan Kiple, Los Gatos, CA (US); Ji Heun Lee, Sunnyvale, CA (US); George Matsumoto, San Jose, CA (US)

(73) Assignee: Google Inc., Mountain View, CA (US)

( * ) Notice: Subject to any disclaimer, the term of this patent is extended or adjusted under 35 U.S.C. 154(b) by 26 days.

(21) Appl. No.: 14/622,330

(22) Filed: Feb. 13, 2015

(65) Prior Publication Data

US 2016/0239053 A1   Aug. 18, 2016

(51) Int. Cl.
*G06F 1/16* (2006.01)

(52) U.S. Cl.
CPC .......... *G06F 1/1679* (2013.01); *G06F 1/1626* (2013.01); *G06F 1/1632* (2013.01); *G06F 1/1654* (2013.01); *G06F 1/1669* (2013.01); *G06F 1/1681* (2013.01)

(58) Field of Classification Search
CPC ........ G06F 1/1669; G06F 1/1632; G06F 1/1626; G06F 1/1616; G06F 1/1624; G09G 5/05
USPC ......... 16/366, 368, 250, 246, 239, 301, 361, 16/236, 354, 223; 345/212, 92, 589, 169, 345/168, 87, 32, 213, 174, 905, 156, 173; 361/679.09, 679.27, 679.43, 679.08, 361/679.01, 679.55, 679.6, 679.02, 361/679.28, 679.2, 679.17, 679.06, 361/679.15, 679.26, 679.56, 679.4, 361/679.04, 679.23, 679.3, 361/679.41–679.44; 29/428, 436; 312/325, 265.2, 235.2, 223.2, 223.6, 137
See application file for complete search history.

(56) References Cited

U.S. PATENT DOCUMENTS

| | | | |
|---|---|---|---|
| 6,381,808 B1 | 5/2002 | Kida | |
| 6,937,468 B2* | 8/2005 | Lin | G06F 1/1632 361/679.41 |
| 7,103,698 B2* | 9/2006 | Zhang | G06F 1/1632 361/679.3 |
| 7,327,560 B1* | 2/2008 | Tabasso | G06F 1/3203 248/917 |
| 7,983,035 B1* | 7/2011 | Ting | F16M 11/041 361/679.41 |
| 8,129,939 B2 | 3/2012 | Locker et al. | |
| 8,472,168 B2* | 6/2013 | Su | G06F 1/1626 361/679.01 |

(Continued)

OTHER PUBLICATIONS

International Search Report and Written Opinion for PCT Patent Application No. PCT/US2015/066113, mailed on May 18, 2016, 16 pages.

(Continued)

*Primary Examiner* — Anthony Haughton
(74) *Attorney, Agent, or Firm* — Brake Hughes Bellermann LLP

(57) ABSTRACT

According to an example embodiment, a base may include a frame, a keyboard enclosed by the frame, and a mount hingedly attached to the frame. The keyboard may be configured to wirelessly communicate with a computing device. The mount may include at least one magnet configured to retain the computing device.

16 Claims, 12 Drawing Sheets

(56) References Cited

U.S. PATENT DOCUMENTS

| | | | | |
|---|---|---|---|---|
| 8,526,172 | B2* | 9/2013 | Dai | G06F 1/1622 16/302 |
| 8,599,542 | B1* | 12/2013 | Healey | G06F 1/1626 345/168 |
| 8,699,215 | B2* | 4/2014 | Whitt, III | G06F 1/1618 345/169 |
| 8,817,457 | B1* | 8/2014 | Colby | G06F 1/1669 206/320 |
| 8,929,070 | B2* | 1/2015 | Liu | H05K 7/20145 165/104.33 |
| 8,947,867 | B2* | 2/2015 | Hsu | G06F 1/1624 361/679.21 |
| 8,995,121 | B2* | 3/2015 | Yen | G06F 1/1632 361/679.2 |
| 9,019,695 | B2* | 4/2015 | Sun | G06F 1/1632 361/679.08 |
| 9,218,025 | B2* | 12/2015 | Bates | G06F 1/1662 |
| 9,256,256 | B2* | 2/2016 | Liang | G06F 1/1632 |
| 9,268,369 | B2* | 2/2016 | Hirai | G06F 1/1654 |
| 9,483,076 | B2* | 11/2016 | Liang | G06F 1/1632 |
| 9,489,054 | B1* | 11/2016 | Sumsion | G06F 3/0208 |
| 2001/0027589 | A1 | 10/2001 | Uneme | |
| 2005/0057893 | A1 | 3/2005 | Homer | |
| 2007/0279002 | A1 | 12/2007 | Partovi | |
| 2010/0123663 | A1* | 5/2010 | Leung | G06F 3/0231 345/169 |
| 2010/0238620 | A1 | 9/2010 | Fish | |
| 2011/0096513 | A1 | 4/2011 | Kim | |
| 2011/0182030 | A1* | 7/2011 | Mayer | G06F 1/183 361/679.58 |
| 2011/0241607 | A1 | 10/2011 | Wiegers | |
| 2011/0255221 | A1* | 10/2011 | Ling | G06F 1/1616 361/679.01 |
| 2012/0057288 | A1* | 3/2012 | Chou | G06F 1/1628 361/679.09 |
| 2012/0087100 | A1 | 4/2012 | Ku | |
| 2012/0170191 | A1* | 7/2012 | Jensen | G06F 1/185 361/679.02 |
| 2013/0039000 | A1* | 2/2013 | Vicente, Jr. | G06F 1/1681 361/679.41 |
| 2013/0070408 | A1* | 3/2013 | Shen | G06F 1/1632 361/679.27 |
| 2013/0163187 | A1* | 6/2013 | Wang | G06F 1/1632 361/679.41 |
| 2013/0279096 | A1* | 10/2013 | Gengler | H05K 7/00 361/679.01 |
| 2013/0279100 | A1 | 10/2013 | Fontana | |
| 2014/0139989 | A1* | 5/2014 | Mori | G06F 1/1628 361/679.09 |
| 2015/0185783 | A1* | 7/2015 | Hui | G06F 1/1656 361/679.29 |

OTHER PUBLICATIONS

European Partial Search Report for EP Application No. 16155043.9, mailed Oct. 10, 2016, 9 Pages.
Invitation to Pay Additional Fees and Partial Search Report for PCT Patent Application No. PCT/US2015/066113, mailed on Mar. 9, 2016, 7 pages.
"Litz Wire", Wikipedia, The Free Encyclopedia, http://en.wikipedia.org/wiki/Litz_wire, printed Nov. 13, 2014, 4 pages.
"Torsion Spring, Music Wire, Right hand Wind, 300 Degree Deflection" Amazon Supply, downloaded Dec. 1, 2014, 2 pages.
Sauter, "Communication Systems for the Mobile Information Society", Bluetooth, 2006, 5 pages.

* cited by examiner

ATTACHING COMPUTING DEVICE TO MOUNT BY MAGNETS

TECHNICAL FIELD

This description relates to charging computing devices.

BACKGROUND

Users of tablet computing devices may desire to use a keyboard. The user may have difficulty arranging the tablet computing device and the keyboard in a convenient manner.

SUMMARY

According to an example embodiment, a base may include a frame, a keyboard enclosed by the frame, and a mount hingedly attached to the frame. The keyboard may be configured to wirelessly communicate with a computing device. The mount may include at least one magnet configured to retain the computing device.

According to another example embodiment, a tablet computing device may include a display, a housing enclosing the display, a first column of magnets, a second column of magnets, and a row of magnets. The housing may have a length in a first direction and a width in a second direction, the width being greater than the length. The first column of magnets may extend in the first direction from a lower end portion of the housing. The second column of magnets may extend in the first direction from the lower end portion of the housing. The row of magnets may extend in the second direction in the lower end portion of the housing.

According to another example embodiment, a system may include a base and a tablet computing device. The base may include a frame, a keyboard enclosed by the frame, and a mount hingedly attached to the frame. The keyboard may be configured to wirelessly communicate with the tablet computing device. The mount may include a first base column of magnets extending in a first direction, the first direction being generally perpendicular to an axis of rotation of the mount about the frame, a second base column of magnets extending in the first direction, and a base row of magnets extending in a second direction, the second direction being generally parallel to the axis of rotation of the mount about the frame. The tablet computing device may include a display, a housing enclosing the display, a first tablet column of magnets, a second tablet column of magnets, and a tablet row of magnets. The housing may have a length in the first direction and a width in the second direction, the width being greater than the length. The first tablet column of magnets may extend in the first direction from a lower end portion of the housing and may be aligned with the first base column of magnets. The second tablet column of magnets may extend in the second direction from the lower end portion of the housing and may be aligned with the second base column of magnets. The tablet row of magnets may extend in the second direction from the lower end portion of the housing and may be aligned with the base row of magnets.

The details of one or more implementations are set forth in the accompanying drawings and the description below. Other features will be apparent from the description and drawings, and from the claims.

BRIEF DESCRIPTION OF THE DRAWINGS

Like reference numbers refer to like elements.

DETAILED DESCRIPTION

Figure 1A:
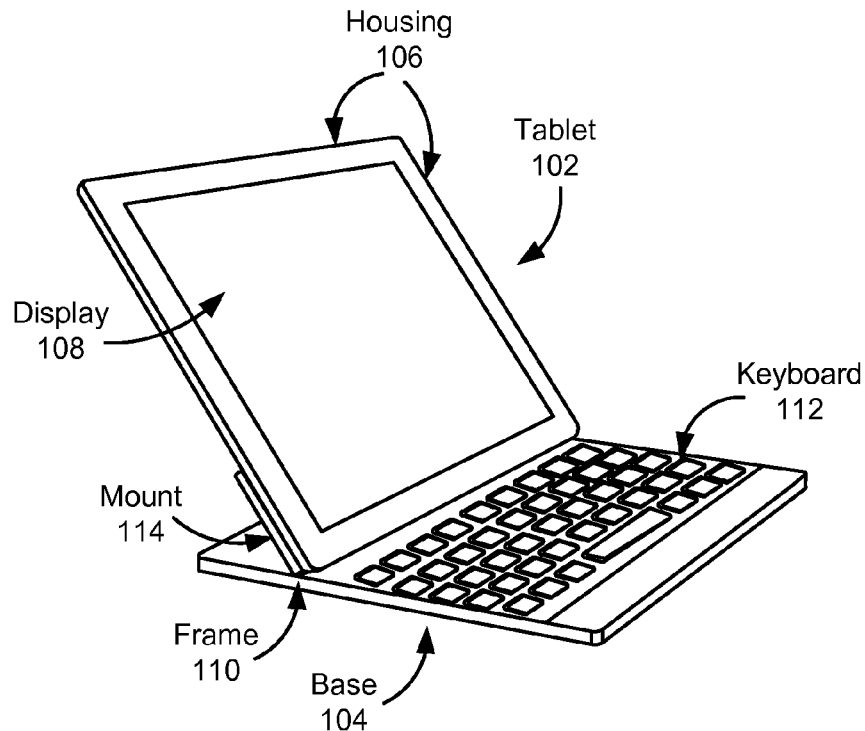
FIG. 1A is a perspective view showing a tablet computing device mounted onto a base with a keyboard in an open position according to an example embodiment.

FIG. 1A is a perspective view showing a tablet computing device 102 mounted onto a base 104 with a keyboard 112 in an open position according to an example embodiment. The tablet computing device 102 may be rectangular, with either sharp or curved corners. The tablet computing device 102 may include a housing 106 enclosing a display 108. The housing 106 may also enclose magnets (not shown in FIG. 1A) that attach the tablet computing device 102 to a mount 114 of the base 104. The display 108 may include any type of electronic display, such as a liquid crystal display (LCD), plasma screen, light-emitting diode (LED) display, Ultra HD or 4K, or an organic LED (OLED) display, as non-limiting examples. The tablet computing device 102 may be configured to wirelessly communicate with a human interface device, such as a keyboard 112, via a wireless communication protocol such as Institute for Electrical and Electronics Engineers (IEEE) 802.15 Bluetooth.

The tablet computing device 102 may also be configured to generate a magnetic field from which the keyboard 112 can induce a current to charge a battery (shown in FIG. 4) of the keyboard 112. The keyboard 112 may include, for example, a single charging coil coupled to the battery. The single charging coil may be configured to induce the current to charge the battery. The single charging coil in the keyboard 112 with no other charging coils included in the keyboard 112, as well as a single charging coil in the tablet computing device 102 with no other charging coils included in the tablet computing device 102, may maximize the efficiency of the tablet computing device 102 charging the keyboard 112, minimizing any wasted energy caused by magnetic fields that are not close enough to the single charging coil in the keyboard 112 to induce the current.

The base 104 may include a frame 110. The frame 110 may be made of a rigid and/or conductive material such as metal, and may be rectangular with either curved or sharp corners. The base 104 may include a keyboard 112. The keyboard 112 may include alphanumeric and other keys, which may be made of an insulative material such as plastic, for providing input to the tablet computing device 102. The keyboard 112 may be configured to wirelessly communicate with the tablet computing device 102 to forward the user's inputted keystrokes to the tablet computing device 102. The keyboard 112 may also be configured to charge a battery included in the keyboard 112 by inducing a current from a magnetic field generated by the tablet computing device 102.

The base 104 may include a mount 114. The mount 114 may be hingedly attached to the frame 110. The mount 114 may rotate from a position resting against a rear portion of the frame 110 to laying across, or nearly across, the keyboard 112. In the example shown in FIG. 1A, the mount 114 may extend from the frame at an angle (shown in FIG. 2B) between twenty and eighty degrees. The tablet 102 may extend beyond an end portion of the frame 110, such as by extending through a plane that is perpendicular to the frame and extends along an end portion of the frame 110 that is opposite from the keyboard 112. The mount 114 may be hingedly attached to the frame 110 by at least one, such as two, friction hinges (not shown in FIG. 1A). The friction hinge(s) may prevent the mount 114 and/or tablet computing device 102 from rotating with respect to the frame 110, and/or cause the mount 114 and/or tablet computing device 102 to remain in position with respect to the frame 110, until a user applies sufficient force to rotate the mount 114 and/or tablet computing device 102 with respect to the frame 110.

In an example embodiment, the friction hinge(s) may collectively have a friction of at least one kilogram per centimeter. The friction in a direction of rotation toward the keyboard 112 may be less than the friction in a direction of rotation away from the keyboard 112, reducing a likelihood of the tablet computing device 102 falling off the mount 114 when the user is rotating the mount 114 and/or tablet computing device 102 toward the keyboard 112 by pressing or pulling the tablet computing device 102 away from the mount 114. The lower friction in the direction of rotation toward the keyboard 112 than the friction in the direction of rotation away from the keyboard may be achieved by combining the friction hinge(s) with one or more torsion springs (shown in FIG. 3). The torsion spring(s) may apply pressure, torque, and/or force in the direction of rotation toward the keyboard 112, reducing the force that the user must apply, such as to the tablet computing device 102, to rotate the mount 114 and/or tablet computing device 102 toward the keyboard 112. In an example embodiment, when the friction hinge(s) is combined with the torsion spring(s), the friction in the direction of rotation toward the keyboard 112 may be between four and six kilograms per centimeter, and the friction in the direction of rotation away from the keyboard 112 may be between eight and twelve kilograms per centimeter. In another example embodiment, when the friction hinge(s) is combined with the torsion spring(s), the friction in the direction of rotation toward the keyboard 112 may be between three and four kilograms per centimeter per hinge (such as 3.7 kg/cm) for a total friction in an example of two hinges of between six and eight kilograms per centimeter (such as 7.4 kg/cm), and the friction in the direction of rotation away from the keyboard 112 may be between four and five kilograms per centimeter per hinge (such as 4.2 kg/cm) for a total friction in the example of two hinges of between eight and ten kilograms per centimeter (such as 8.4 kg/cm).

The mount 114 may hold the tablet computing device 102 in an upright position for display to a user. The tablet computing device 102 may be held to the mount 114 by magnetic attraction. The tablet computing device 102 may include at least one magnet (not shown in FIG. 1A), and the mount 114 may include at least one magnet (not shown in FIG. 1A). The attraction of the at least one magnet in the mount 114 to the at least one magnet in the tablet computing device 102 may retain the tablet computing device 102 against the mount 114 in the upright position shown in FIG. 1A. In an example embodiment, the total strength of attraction of the magnets to each other may be between thirty and fifty newtons and/or between thirty-five and forty-five newtons.

Figure 1B:
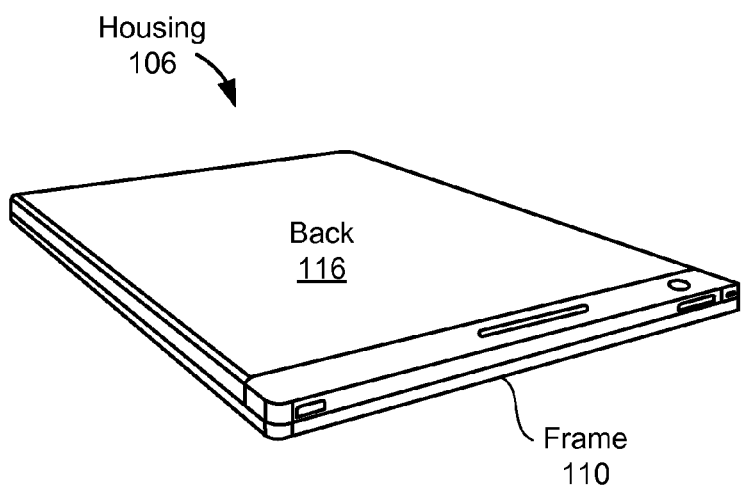
FIG. 1B is a perspective view showing the tablet computing device facing down onto the base according to an example embodiment.

FIG. 1B is a perspective view showing the tablet computing device 102 facing down onto the base 104 (not labeled in FIG. 1B) according to an example embodiment. As shown in FIG. 1B, the display 108 (not shown in FIG. 1B) may face toward the base 104 (not labeled in FIG. 1B), and a back 116 of the housing 106 of the tablet computing device 102 may face away from the base 104, forming a closed position which protects the display 108 (not shown in FIG. 1B). Magnets included in the housing 106 of the tablet computing device 102, such as within one, two, three, or four corners of the housing 106 of the tablet computing device 102, may align with a same number of magnets in corresponding corners of the base 104, retaining the tablet computing device 102 in position with respect to the base 104.

Figure 1C:
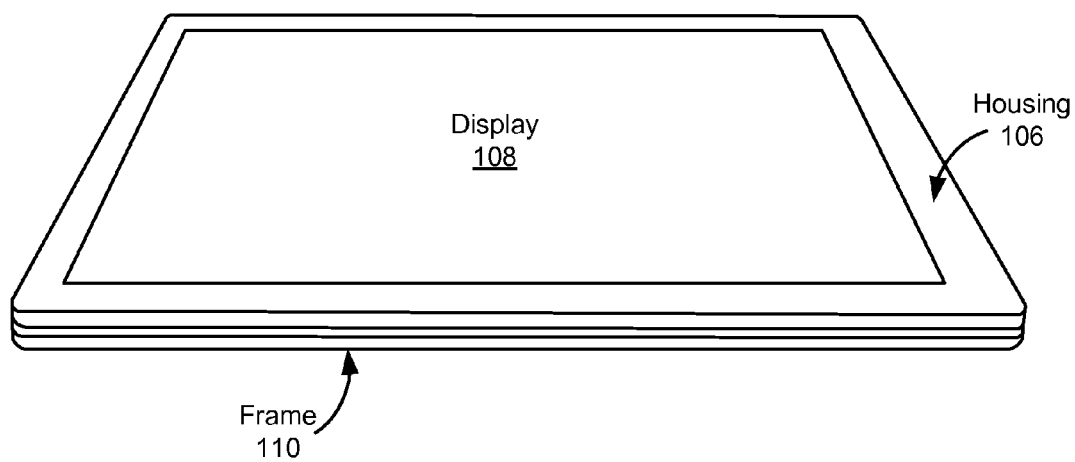
FIG. 1C is a perspective view showing the tablet computing device facing up from the base according to an example embodiment.

FIG. 1C is a perspective view showing the tablet computing device 102 facing up from the base 104 (not labeled in FIG. 1B) according to an example embodiment. As shown in FIG. 1C, the display 108 faces away from the base 104, enabling the user to use the combination and/or system of the tablet computing device 102 and base 104 as a tablet without a keyboard. Magnets included in the housing 106 of the tablet computing device 102, such as within one, two, three, or four corners of the housing 106 of the tablet computing device 102, may align with a same number of magnets in corresponding corners of the base 104, retaining the tablet computing device 102 in position with respect to the base 104.

Figure 2A:
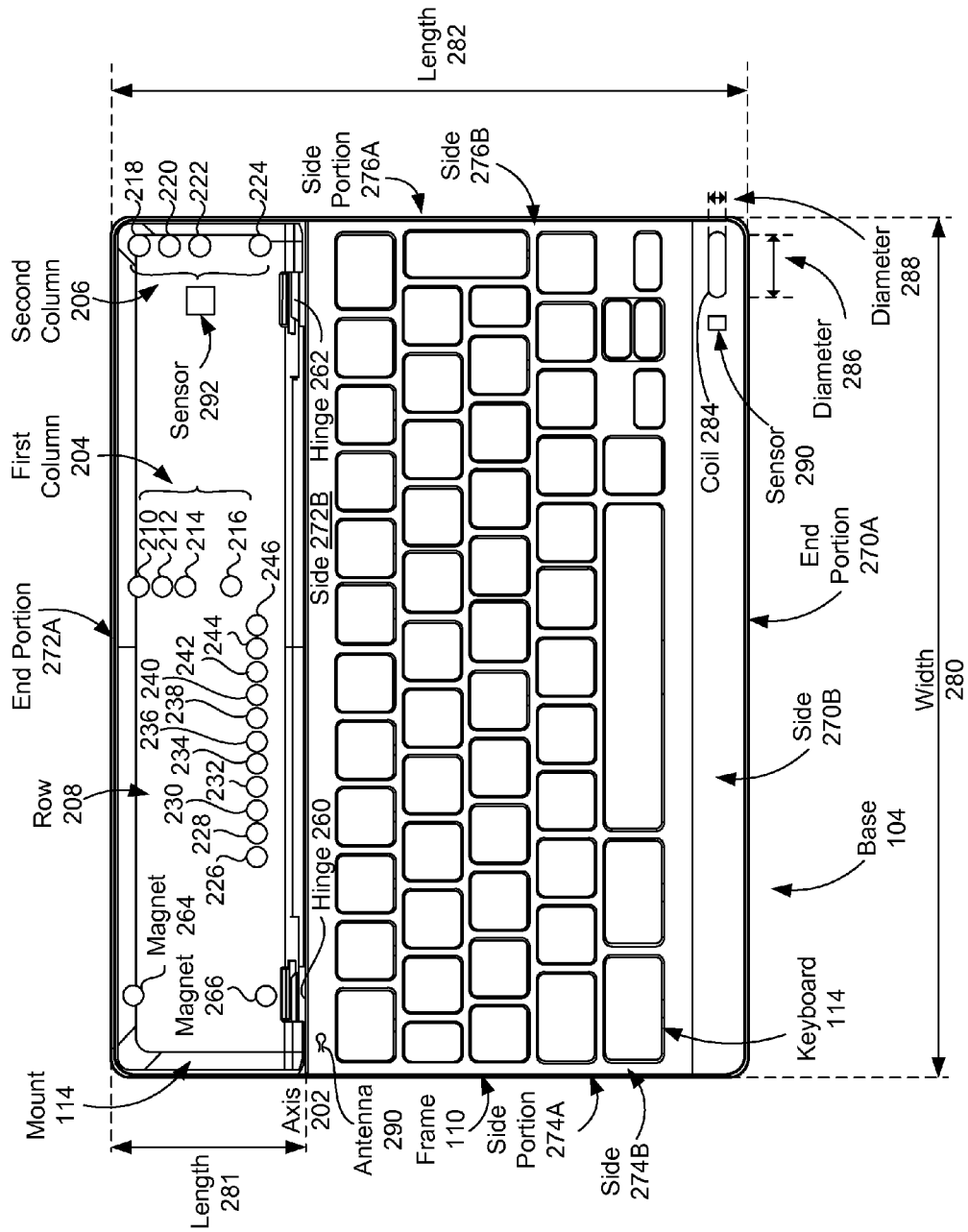
FIG. 2A is a top view of the base according to an example embodiment.

FIG. 2A is a top view of the base 104 according to an example embodiment. The base 104 may include the frame 110. The frame 110 may be made of a rigid material, such as metal or plastic. The frame may be rectangular, with either rounded or sharp corners. A width 280 of the frame 110 and/or base 104 may be greater than a length 282 of the frame 110 and/or base 104. The length 282 of the frame 110 may be between one hundred and sixty millimeters and two hundred millimeters, between one hundred and seventy millimeters and one hundred and ninety millimeters, or between one hundred and seventy-five millimeters and one hundred and eighty-five millimeters.

The frame 110 may partially enclose the keyboard 112. A bottom side of the keyboard 112 may be in contact with the frame 110, and/or the frame 110 may be disposed on the bottom side of the keyboard 112. A top portion of the keyboard 112 facing the viewer of FIG. 2A may be made of an insulative material such as plastic. The insulative material such as plastic may allow the magnetic field generated by the tablet computing device 102 to penetrate the keyboard 112 and induce an electric current in the charging coil 284 of the keyboard 112. The keyboard 112 may include a first side 270B and/or front portion, a second side 276B and/or a right side (from the perspective of a user) adjacent to the first side 270B and/or front portion, a third side 272B and/or back portion adjacent to the second side 276B and/or right side and opposite from the first side 270B and/or front portion, and a fourth side 274B and/or left side adjacent to the first side 270B and/or front portion and adjacent to the third side 272B and/or back portion and opposite from the second side 276B and/or right side. The first side 270B and/or front portion may contact a perimeter of the frame 110, the second side 276B and/or right side may contact the perimeter of the frame 110, the third side 272B and/or back portion may not contact the perimeter of the frame 110, and the fourth side 274B and/or left side may contact the perimeter of the frame 110. The perimeter of the frame 110 may include a first end portion 270A in contact with the first side 270B of the keyboard 112, a second end portion 272A displaced from the third side 272B of the keyboard 112, a first side portion 274A in contact with the third side 274A of the keyboard 112, and a second side portion 276A in contact with the second side 276B of the keyboard 112.

The mount 114 may be hingedly attached to the frame 110 at one or more, such as two, locations in the frame 110 adjacent to the keyboard 112. When laying flat against the base 104, the mount 114 may occupy the space between the third side 272B and/or back portion of the keyboard 112 and the second end portion 272A of the frame 110. The depth and/or length 281 of the mount 114, as measured from the second end portion 272A of the frame 110 to the third side 272B of the keyboard 112, may be at least one-fifth of the length 282 of the frame 110, such as between forty and sixty millimeters or between forty-five and fifty-five millimeters. The depth and/or length 281 of the mount 114, at least one-fifth of the length 282 of the frame 110, may be sufficient to prevent the system including the base 104 and tablet computing device 102 (not shown in FIG. 2B) from tipping backward away from the user when the base 104 is placed on a flat surface such as a table and the tablet computing device 102 is mounted onto the mount 114.

In the example shown in FIG. 2A, the base 104 includes two hinges 260, 262 connecting and/or hingedly attaching the mount 114 to the frame 110. The hinges 260, 262 may enable the mount 114 to rotate about an axis 202 with respect to the frame 110 and/or keyboard 112. The axis 202 may extend through both of, and/or all, the hinges 260, 262. The hinges 262 may be friction hinges, with friction sufficient to resist the force of gravity from the mount 114 and tablet computing device 102.

The keyboard 112 and/or base 104 may include a charging coil 284 for receiving power from the tablet computing device 102 to charge the battery (shown in FIG. 4) that powers the keyboard 112. The charging coil 284 may induce a current from a magnetic field generated by the tablet computing device 102. The induced current may charge the battery that powers the keyboard 112.

The keyboard 112 and/or base 104 may include a single charging coil 284 to charge the battery. The charging coil 284 may be included in the first side portion 270B and/or front portion or first end portion of the keyboard 112. The single charging coil 284 in the keyboard 112 and/or base 104, and the single charging coil in the tablet computing device 102, may increase efficiency of charging by minimizing magnetic fields that do not induce current in the keyboard 112 and/or base 104. The charging coil 284 may be located in a corner of the keyboard 112 and/or base 104, such as the lower right-hand corner near an intersection of the first side 270B and second side 276B of the keyboard and/or the first end portion 270A and second side portion 276A of the frame 110, or the lower left-hand corner near an intersection of the first side 270B and fourth side 274B of the keyboard 112 and/or the first end portion 270A and the first side portion 274A of the frame 110. The keyboard 112 may include a magnet near the charging coil 284. The magnet near the charging coil 284 may prompt a charging sensor of the tablet computing device 102 to enter a charging mode and generate the magnetic field to charge the battery of the keyboard 112.

The charging coil 284 may be oval-shaped. A first diameter 286 of the charging coil 284 may extend in the direction of the width 280 of the frame 110, and may be approximately the same as, such as within 5% of or within 10% of, a diameter of the charging coil of the tablet computing device 102. A second diameter 288 of the charging coil 284 may be less than the first diameter 286, such as between one-third and one-fifth of the first diameter 286; the first diameter 286 may be between three and five times the second diameter 288. In an example embodiment, the first diameter 286 of the coil 284 may be between twenty and thirty-five millimeters (20 mm to 35 mm) and the second diameter 288 of the coil 284 may be between five and ten millimeters (5 mm to 10 mm). In another example embodiment, the first diameter 286 of the coil 284 may be between twenty-five and thirty millimeters (25 mm to 30 mm) and the second diameter 288 of the coil 284 may be between six and eight millimeters (6 mm to 8 mm). The charging coil 284 may include a wire such as a litz wire. The charging coil 284 may include between four and eight turns, such as six turns. The charging coil 284 may generate between four and six watts, such as five watts, of power, according to an example embodiment.

The base 104 may include a connection sensor 292. The connection sensor 292 may detect proximity of the tablet computing device 102, such as by detecting proximity of a magnet in the tablet computing device, and may prompt the tablet computing device 102 and base 104 to initiate a connection establishment sequence for the keyboard 112 to send input, such as keyboard input from the user, to the tablet computing device 102. The sensor 292 may also prompt the keyboard 112 to power on based on the detected proximity of the tablet computing device 102. The connection sensor 292 may include a Hall-effect sensor. The tablet computing device 102 may also include a connection sensor, which may prompt the tablet computing device 102 and base 104 to initiate a connection establishment sequence. The connection establishment sequence is shown and described further with respect to FIG. 6.

The keyboard 112 and/or base 104 may include a charging sensor 290 near the charging coil 284 in an example embodiment. The charging sensor 290 may be configured to detect proximity of a magnet in the tablet computing device 102 and prompt the base 104 and tablet computing device 102 to initiate a charging sequence. The charging sensor 290 may include a Hall-effect sensor. In another example embodiment, the tablet computing device 102 may include a sensor, such as a Hall-effect sensor, that prompts the base 104 and/or keyboard 112 to initiate the charging sequence. The tablet computing device 102, the base 104, or both, may include a charging sensor that prompts the respective device to initiate the charging sequence. The charging sequence may include the tablet computing device 102 generating a magnetic field via a coil included in the tablet computing device 102 and the base 104 inducing a current via the coil 284 to charge the battery. The charging sequence is shown and described further with respect to FIG. 7.

The mount 114 may include at least one magnet to secure the tablet computing device 102 to the mount 114, holding the tablet computing device 102 in an upright position for ease of viewing. In an example embodiment, the mount 114 may include a first column 204 of magnets extending in a first direction. The first direction may be generally perpendicular, such as between eighty-five and ninety-five degrees (85-95°) from, the axis 202 of rotation of the hinge(s) 260, 262 and/or mount 114 about the frame 110. The mount 114 may also include a second column 206 of magnets extending in the first direction. The first and second columns 204, 206 may be displaced from each other, such as by at least one quarter of the width 280 of the frame 110, in a second direction that is parallel to the axis 202. The first and second columns 204, 206 of magnets may attract corresponding columns of magnets (shown in FIG. 5B) of the tablet computing device 102 to prevent the tablet computing device 102 from sliding back and forth in the second direction or rotating on the mount 114.

The first column 204 may include at least one magnet 210, at least two magnets 210, 212, and least three magnets 210, 212, 214, at least four magnets 210, 212, 214, 216, or any number of magnets. The second column 206 may include at least one magnet 218, at least two magnets 218, 220, and least three magnets 218, 220, 222, at least four magnets 218, 220, 222, 224, or any number of magnets. The magnets in the first and second columns 204, 206 may be opposite in polarity to magnets in the tablet computing device 102 that will be aligned with the magnets in the first and second columns 204, 206 when the tablet computing device 102 is mounted on the mount 114 in the position shown in FIG. 1A. The opposite polarities may cause the magnets to attract each other, retaining the tablet computing device 102 to the mount 114 and/or base 104. The polarities of the magnets in each of the first and second columns 204, 206 may be the same in each column 204, 206, may alternate, or may be arranged in any combination.

The mount 114 may also include a row 208 of magnets extending in the second direction, which may be generally parallel to, such as within five degrees (5°) of, the axis 202. The row 208 of magnets may attract a corresponding row of magnets (shown in FIG. 5B) of the tablet computing device 102 to prevent the tablet computing device 102 from sliding back and forth in the first direction. The row 208 of magnets may be located in a lower portion of the mount 114, such as closer to the third side 272B of the keyboard 112 than to the second end portion 272A of the frame 110, to prevent the tablet computing device 102 from rotating about a top portion of the mount 114 (the top portion of the mount 114 being adjacent to the second end portion 272A when the mount 114 is flat against the frame 110).

The row 208 of magnets may include any number of magnets, such as at least one magnet 226, at least two magnets 226, 228, at least three magnets 226, 228, 230, at least four magnets 226, 228, 230, 232, or any number of magnets 226, 228, 228, 230, 232, 234, 236, 238, 240, 242, 244, 246. The magnets in the row 208 may be opposite in polarity to magnets included in a row in the tablet computing device 102, causing the magnets in the row in the mount 114 to attract the magnets in the row in the tablet computing device 102, retaining the tablet computing device 102 to the mount 114 and/or the base 104. The polarities of the magnets in the row 208 may all be the same, may alternate, or may be arranged in any combination.

The mount 114 may also include magnets 264, 218, 224, 266 in corner portions of the mount 114. The magnets 264, 218, 224, 266 in corner portions of the mount 114 may be included in the columns 204, 206, such as the magnets 218, 224 being included in the second column 206, or may not be included in any of the columns 204, 206, such as the magnets 264, 266 which are not included in either the first or second columns 204, 206. Magnets 264, 218 in the upper corners, which are closer to the second end portion 272A of the frame 110 than to the third side 272B of the keyboard 112, and/or any of the magnets, may align with corresponding magnets in the tablet computing device 102 when the mount 114 is flat against the frame 110 and the tablet computing device 102 is laid against the entire base 104 in either a closed position as shown in FIG. 1B or an open position as shown in FIG. 1C.

Figure 2B:
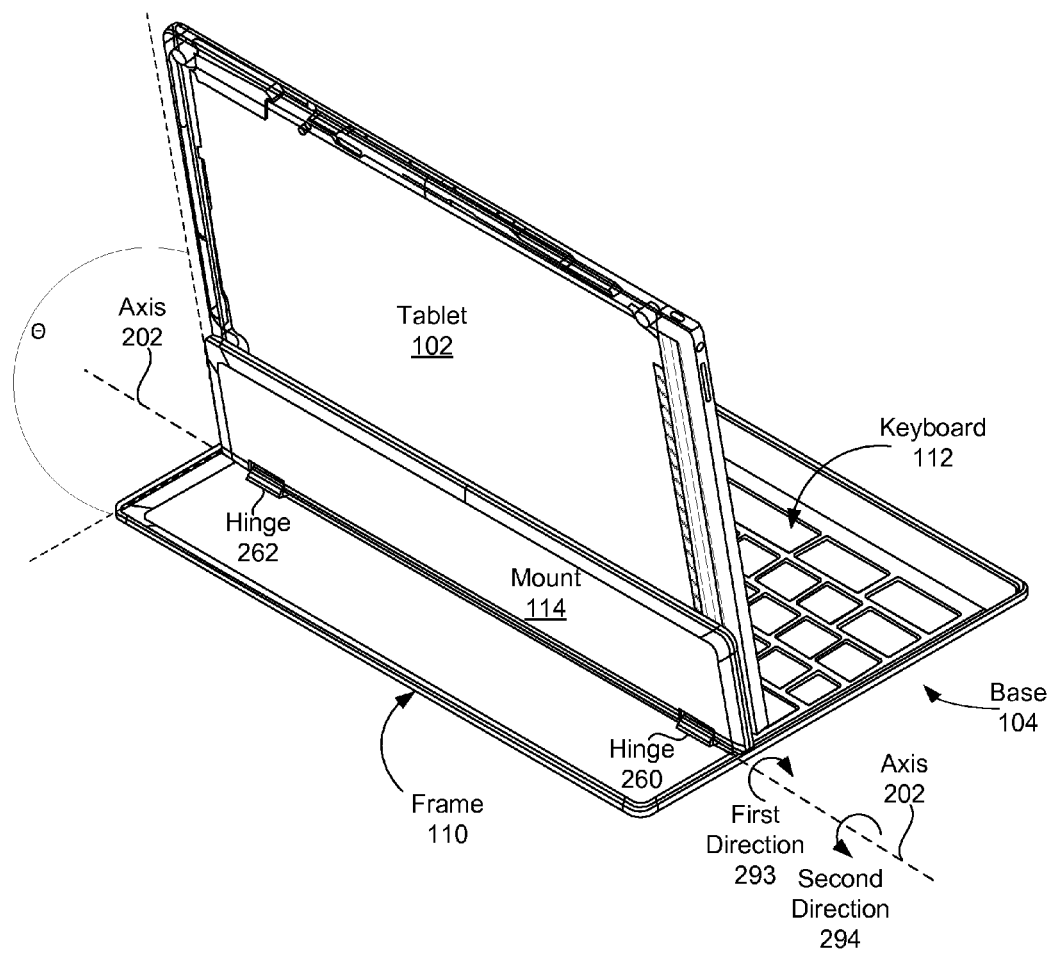
FIG. 2B is a perspective view of the base with the tablet computing device mounted thereon according to an example embodiment.

FIG. 2B is a perspective view of the base 104 with the tablet computing device 102 mounted thereon according to an example embodiment. As discussed above, the hinges 260, 262 may be friction hinges which cause the mount 114 to maintain its position relative to the base 104 and/or frame 110, resisting the force of gravity even when the tablet computing device 102 is attached to the mount 114, until a user applies sufficient force to the tablet computing device 102 and/or mount 114 to rotate the mount 114 relative to the base 104 and/or frame 110.

As discussed above, the friction of the hinges 260, 262 may be lower in a first direction 293, in which the mount 114 rotates toward the keyboard 112, than in a second direction 294, in which the mount 114 rotates away from the keyboard 112. The lower friction in the first direction 293 than in the second direction 294 may be effected by a torsion spring, shown in FIG. 3.

The mount 114 may rotate with respect to the base 104 and/or frame 110 to create an angle Θ between the frame 110 and the mount 114. The angle Θ of the mount 114 with respect to the frame 110 may vary between zero degrees (0°) and nearly one hundred eighty degrees (180°), such as one hundred and seventy-five degrees (175°). The keyboard 112 and/or tablet computing device 102 may prevent the mount 114 from rotating the full one hundred and eighty degrees (180°) away from the frame 110, according to an example embodiment. In the examples shown in FIGS. 1A and 2B, the angle Θ may be between twenty and eighty degrees (20° to 80°).

Figure 2C:
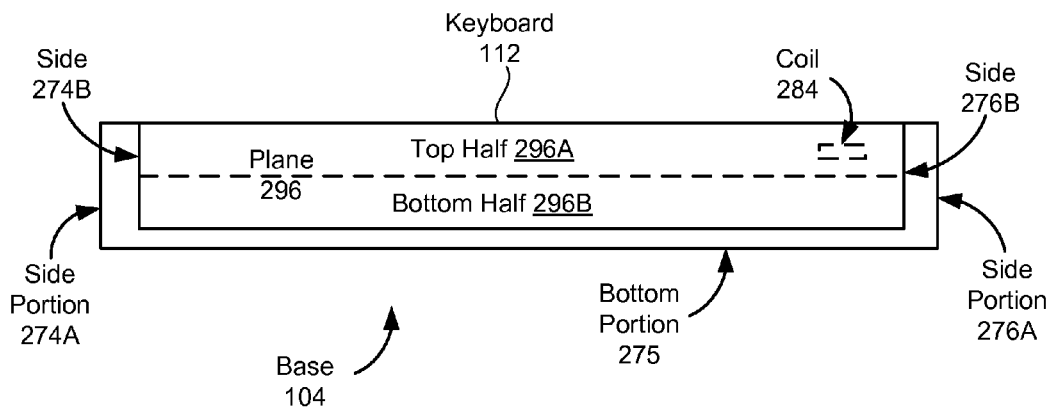
FIG. 2C is a side view of the base according to an example embodiment.

FIG. 2C is a side view of the base 104 according to an example embodiment. A plane 296 may bisect the base 104 into a top half 296A, which is closer than a bottom half 296B to a top of the keyboard 112, and the bottom half 296B, which is farther than the top half 296A from the top of the keyboard. The charging coil 284 may be included in the top half 296A of the base 104, and/or closer to a top of the keyboard 112 than to a bottom of the keyboard 112. The inclusion of the charging coil 284 in the top half 296A of the base 104 may make the coil 284 proximal to the tablet computing device 102 when the tablet computing device 102 is laid on top of the base 104 as shown in FIG. 1B, increasing the strength of the magnetic field at the coil 284.

Figure 3:
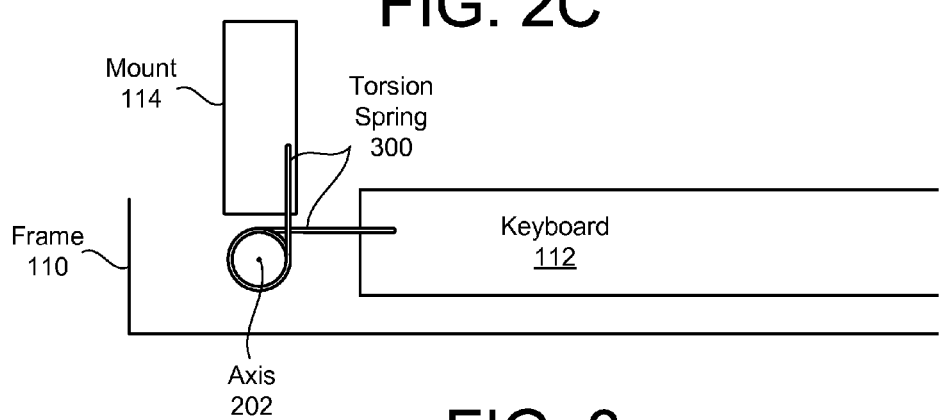
FIG. 3 is a side cross-sectional view of the base according to an example embodiment.

FIG. 3 is a side cross-sectional view of the base 104 according to an example embodiment. As shown in FIG. 3, the base 104 may include one or more torsion springs 300 intersected by the axis 202. The one or more torsion springs 300 may be included in, adjacent to and/or in contact with, the hinges 260, 262 (not shown in FIG. 3). The one or more torsion springs 300 may be biased to rotate the mount 114 in the first direction 293 (not labeled in FIG. 3) toward the keyboard 112, causing the friction of the hinges 260, 262 to be lower in the first direction 293 than in the second direction 294 (not labeled in FIG. 3).

Figure 4:
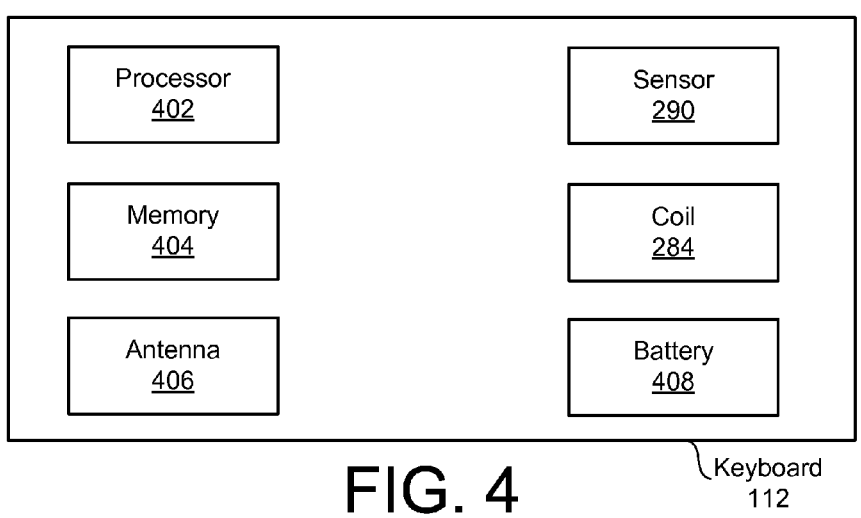
FIG. 4 is a schematic view of the keyboard according to an example embodiment.

FIG. 4 is a schematic view of the keyboard 112 according to an example embodiment. While components shown in FIG. 4 are described as being included in the keyboard 112, they could also be included in any combination of the keyboard 112, frame 110, mount 114, or any other component of the base 104.

The keyboard 112 may include at least one processor 402. The at least one processor 402 may include a general-purpose processor configured to execute instructions to perform functions, methods, or techniques, such as the functions, modules, and/or techniques described herein with respect to the keyboard 112. The at least one processor 402 may process keystroke inputs into keys on the keyboard 112 and generate signals for an antenna 406 to send to the tablet computing device 102.

The keyboard 112 may include at least one memory device 404. The at least one memory device 404 may store instructions and/or data. The instructions stored by the at least one memory device 404 may be configured to cause the at least one processor 402 to perform any of the functions, methods, and/or techniques described herein with respect to the keyboard 112.

The keyboard 112 may include at least one antenna 406. The at least one antenna 406 may be configured to wirelessly transmit and/or receive signals to and/or from any device outside the base 104, such as the tablet computing device 102. The at least one antenna 406 may transmit and/or receive signals according to any mutually understood communication and/or networking protocol, such as Bluetooth.

The keyboard 112 may include the charging sensor 290. The charging sensor 290 may detect the proximity of the tablet computing device 102 (not shown in FIG. 4) in a position to generate the magnetic field to charge the keyboard 112.

The keyboard 112 may include the coil 284. The coil 284 may induce the electric current to charge a battery 408.

The keyboard 112 may include the battery 408. The battery 408 may power other components of the keyboard 112. The battery 408 may be rechargeable, and may be recharged by the current induced by the coil 284 from the magnetic field generated by the tablet computing device 102.

Figure 5A:
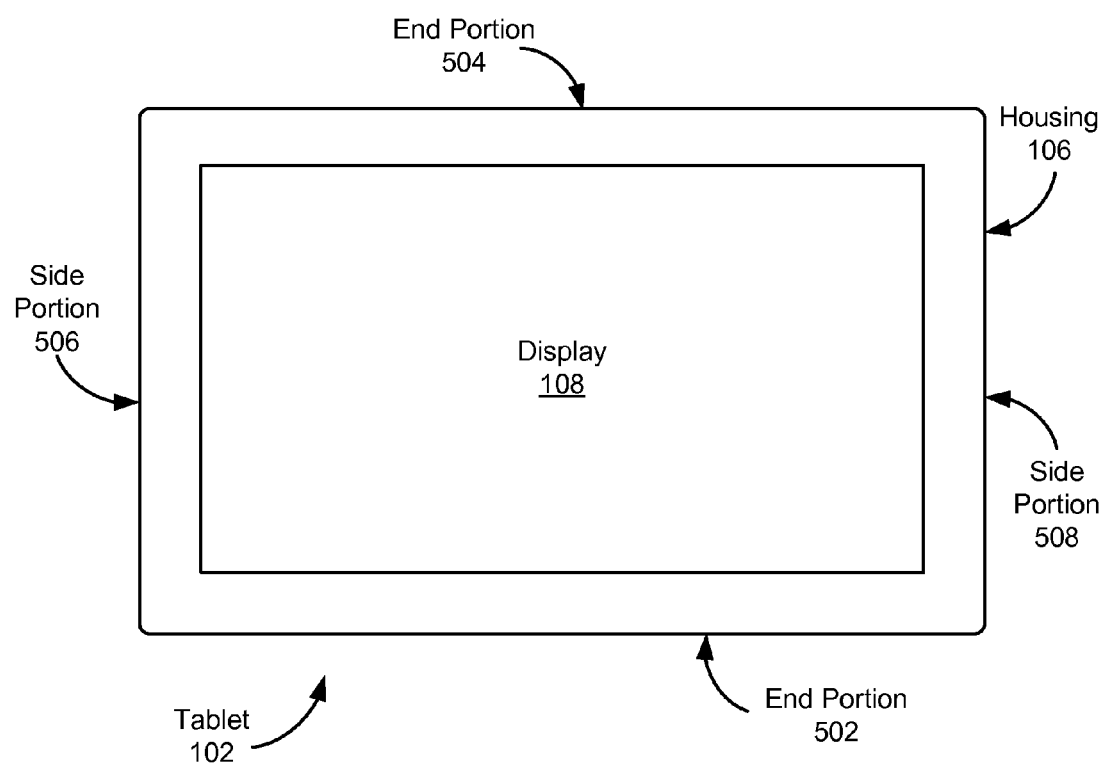
FIG. 5A is a top view of the tablet computing device according to an example embodiment.

FIG. 5A is a top view of the tablet computing device 102 according to an example embodiment. The tablet computing device 102 may include the housing 106 surrounding the display 108 and enclosing components of the tablet computing device 102, such as the components shown and described with respect to FIGS. 5B, 5C, and 5D. The housing 106 may include a front end portion 502, a rear end portion 504 opposite from the front end portion 502, a first side portion 506 adjacent to both the front end portion 502 and the rear end portion 504, and a second side portion 508 opposite from the first side portion 506 and adjacent to both the front end portion 502 and the rear end portion 504. While not shown in FIG. 5A, the housing 106 may also include the back 116 (shown in FIG. 1B) adjacent to the front end portion 502, the rear end portion 504, the first side portion 506, and the second side portion 508, and opposite from the display 108.

Figure 5B:
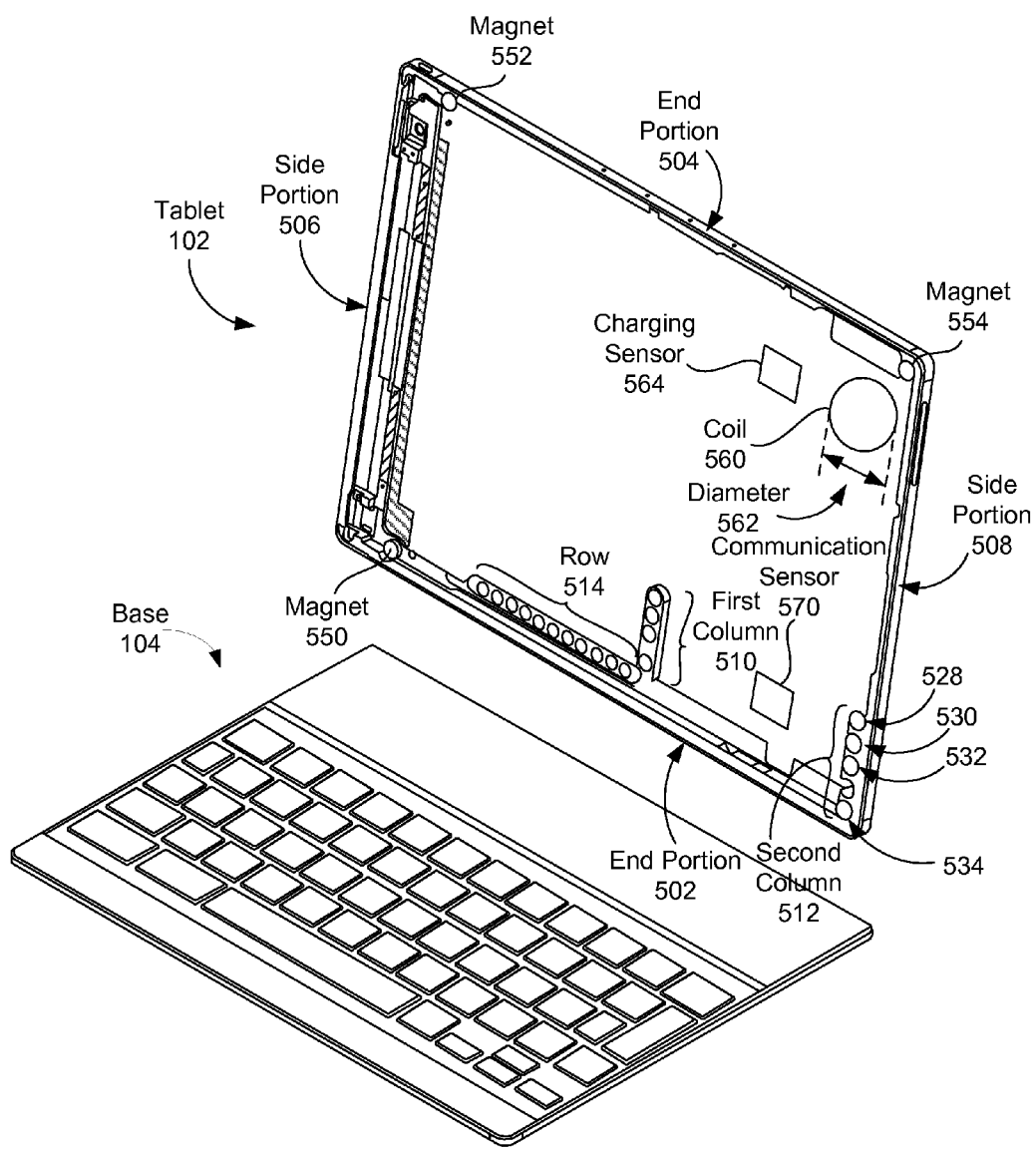
FIGS. 5B and 5C are cross-sectional views of the tablet computing device according to an example embodiment.
Figure 5C:
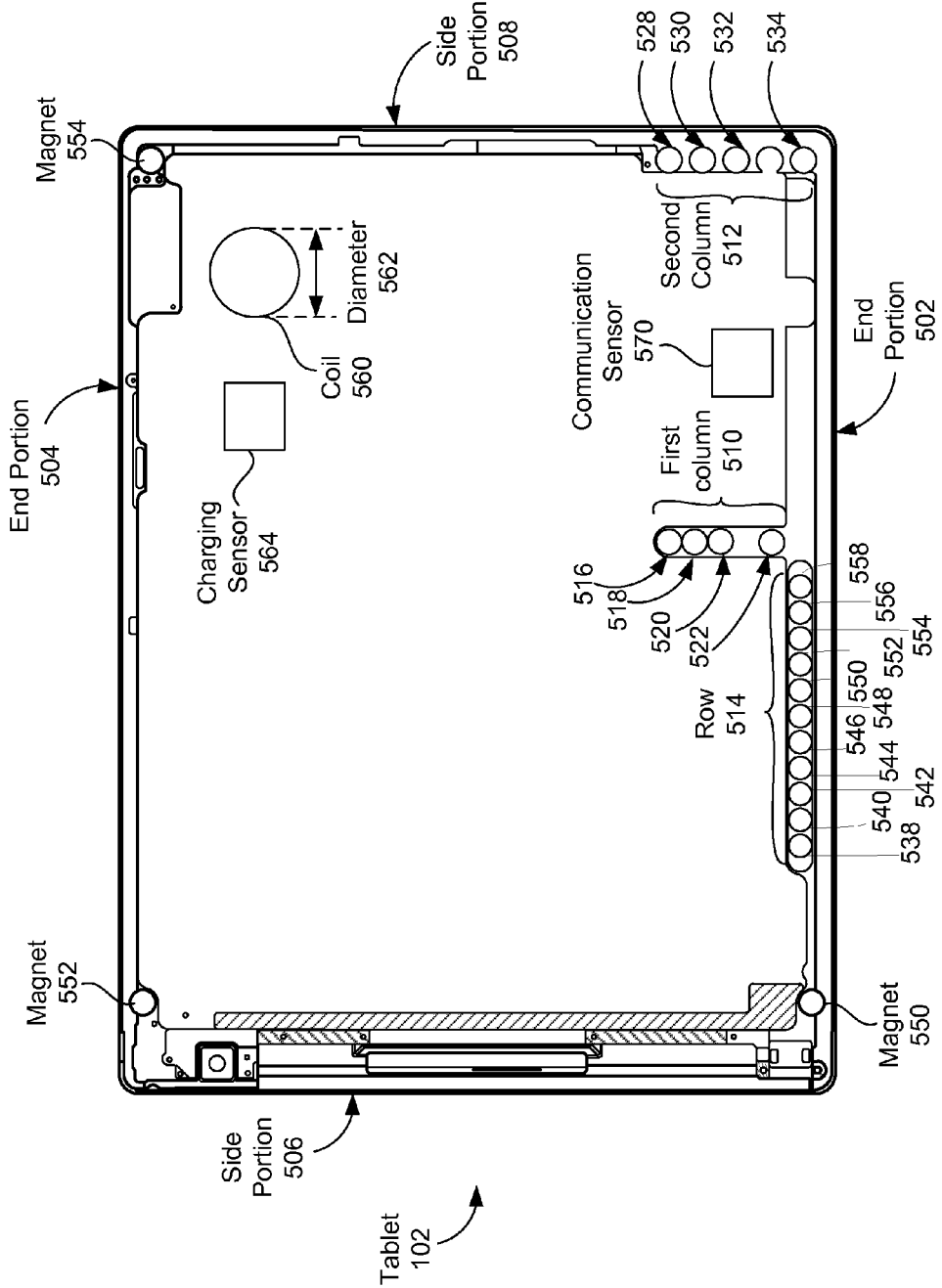

FIGS. 5B and 5C are cross-sectional views of the tablet computing device 102 according to an example embodiment. FIG. 5B also shows the base 104. As shown in FIGS. 5B and 5C, the tablet computing device 102 may include a first column 510 of magnets and a second column 512 of magnets. Each of the first column 510 and second column 512 of magnets may extend from the front end portion 502 of the housing 106 in a direction generally parallel to, such as within five degrees (5°) of, a direction that the first and second side portions 506, 508 extend from the front end portion 502 to the rear end portion 504. A spacing between the first and second columns 510, 512 of magnets may be the same as the spacing between the first and second columns 204, 206 of magnets included in the mount 114 of the base 104, and the lengths and numbers of magnets included in the first and second columns 510, 512 in the tablet computing device 102 may be the same as the lengths and numbers of magnets included in the first and second columns 204, 206 of magnets included in the mount 114 of the base 104. The polarities of the magnets 516 through 522 and 528 through 534 included in the first and second columns 510, 512 of the tablet computing device 102 may be opposite to the polarities of the magnets 210 through 224 included in the mount 114 of the base 104, causing the magnets 516 through 522 and 528 through 534 to be attracted to the magnets 210 through 224, causing the tablet computing device 102 to be retained to the mount 114 of the base 104.

The tablet computing device 102 may also include a row 514 of magnets adjacent to the front end portion 502. The row 514 of magnets may be a same length as the row 208 included in the mount 114 of the base 104, may have a same location relative to the columns 510, 512 as the row 208 has relative to the first and second columns 204, 206, may have a same number of magnets 538 through 548 as the row 208, and the magnets 538 through 548 may be opposite in polarity to the magnets 226 through 248 included in the row 208 in the mount 114 of the base 104.

The tablet computing device 102 may include a charging coil 560 in a corner portion, such as near an intersection of the rear end portion 504 and the second side portion 508, of the housing 106. The charging coil 560 may generate the magnetic field to induce the current in the charging coil 284 of the keyboard 112. The charging coil 560 may be circular, with a diameter 562 approximately the same as, such as within ten percent (10%) of, the first and/or longer diameter 286 of the charging coil 284 of the keyboard 112, such as between twenty and thirty-five millimeters or between twenty-five and thirty millimeters. In another example embodiment, the charging coil 560 may be oval-shaped, with a diameter in a first direction about half of a diameter in a second direction; the diameter in the first direction may be between ten and eighteen millimeters and the diameter in the second direction may be between twenty and thirty-five millimeters, or the diameter in the first direction may be between twelve and fifteen millimeters and the diameter in the second direction may be between twenty-five and thirty millimeters, according to example embodiments.

The tablet computing device 102 may also include a charging sensor 564. The charging sensor 564 may detect proximity of the base 104 in a position to charge the battery 408, such as the closed position shown in FIG. 1B, and may prompt the tablet computing device 102 to initiate a charging sequence, such as the charging sequence shown and described with respect to FIG. 7. The charging sensor 564 may include a Hall-effect sensor.

The tablet computing device 102 may also include a communication sensor 570. The communication sensor 570 may detect proximity of the mount 114 such as by detecting proximity of a magnet in the mount 114, indicating that the keyboard 112 is in a position to communicate with the tablet computing device 102, such as the position shown in FIG. 1A, and may prompt the tablet computing device 102 to initiate a charging sequence, such as the charging sequence shown and described with respect to FIG. 6. The communication sensor 570 may include a Hall-effect sensor.

The tablet computing device 102 may also include magnets in the corners of the housing 106, such as magnets 550, 552, 554, 534. The corner magnets 550, 552, 554, 534 may be opposite in polarity to (and/or may each include pairs of magnets with opposite polarities on opposite or top/bottom sides of the tablet computing device 102), and may align with, the magnets 264, 218 in the mount 114 of the base 104, and may retain the tablet computing device 102 in either of the positions shown in FIGS. 1B and 1C.

Figure 5D:
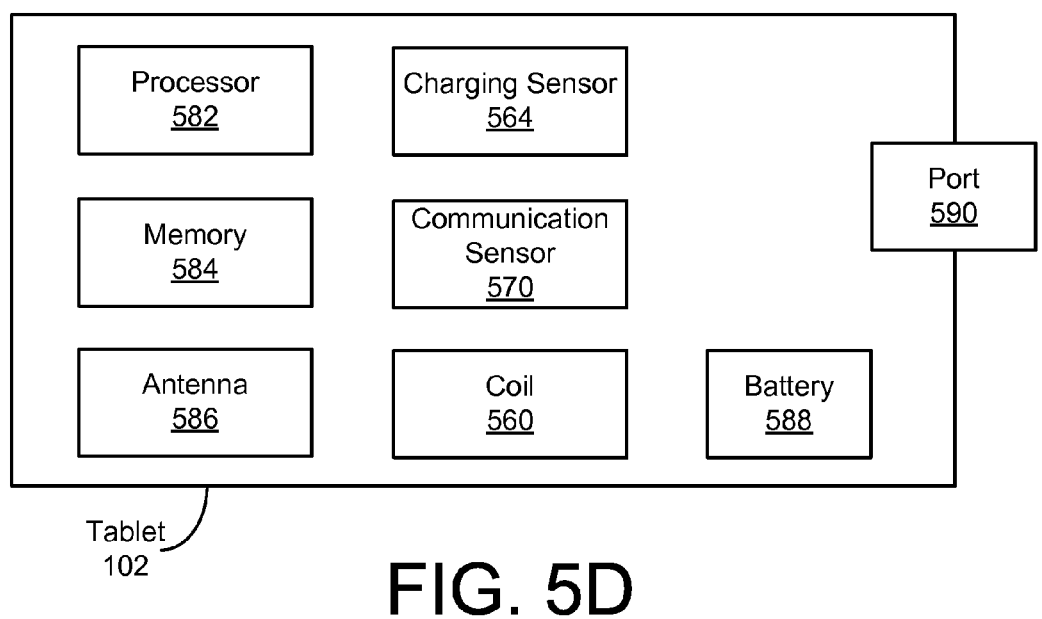
FIG. 5D is a schematic view of the tablet computing device according to an example embodiment.

FIG. 5D is a schematic view of the tablet computing device 102 according to an example embodiment. The tablet computing device 102 may include at least one processor 582. The at least one processor 582 may be capable of executing instructions to cause the tablet computing device 102 to perform any of the functions, methods, or techniques described herein with respect to the tablet computing device 102. The at least one processor 582 may provide image data based upon which the display 108 may generate images. The tablet computing device 102 may also include at least one memory device 584. The at least one memory device 584 may store data and instructions. The instructions may include instructions for the at least one processor 582 to cause the tablet computing device 102 to perform any of the functions, methods, or techniques described herein with respect to the tablet computing device 102.

The tablet computing device 102 may include at least one antenna 586. The at least one antenna 586 may be configured to transmit and receive wireless signals to and from electronic devices outside the tablet computing device 102, such as the keyboard 112. The at least one antenna 586 may transmit and receive wireless signals according to any mutually understood communication and/or networking protocol, such as Bluetooth.

The tablet computing device 102 may include the charging sensor 564, the communication sensor 570, and/or the charging coil 560. The tablet computing device 102 may also include a battery 588. The battery 588 may provide power to other components in the tablet computing device 102. The battery 588 may be rechargeable.

The tablet computing device 102 may include a port 590. The port 590 may include a wired interface for transmitting and/or receiving signals and power, such as a Universal Serial Bus (USB) port. The tablet computing device 102 may recharge the battery 588 using power received via the port 590.

Figure 6:
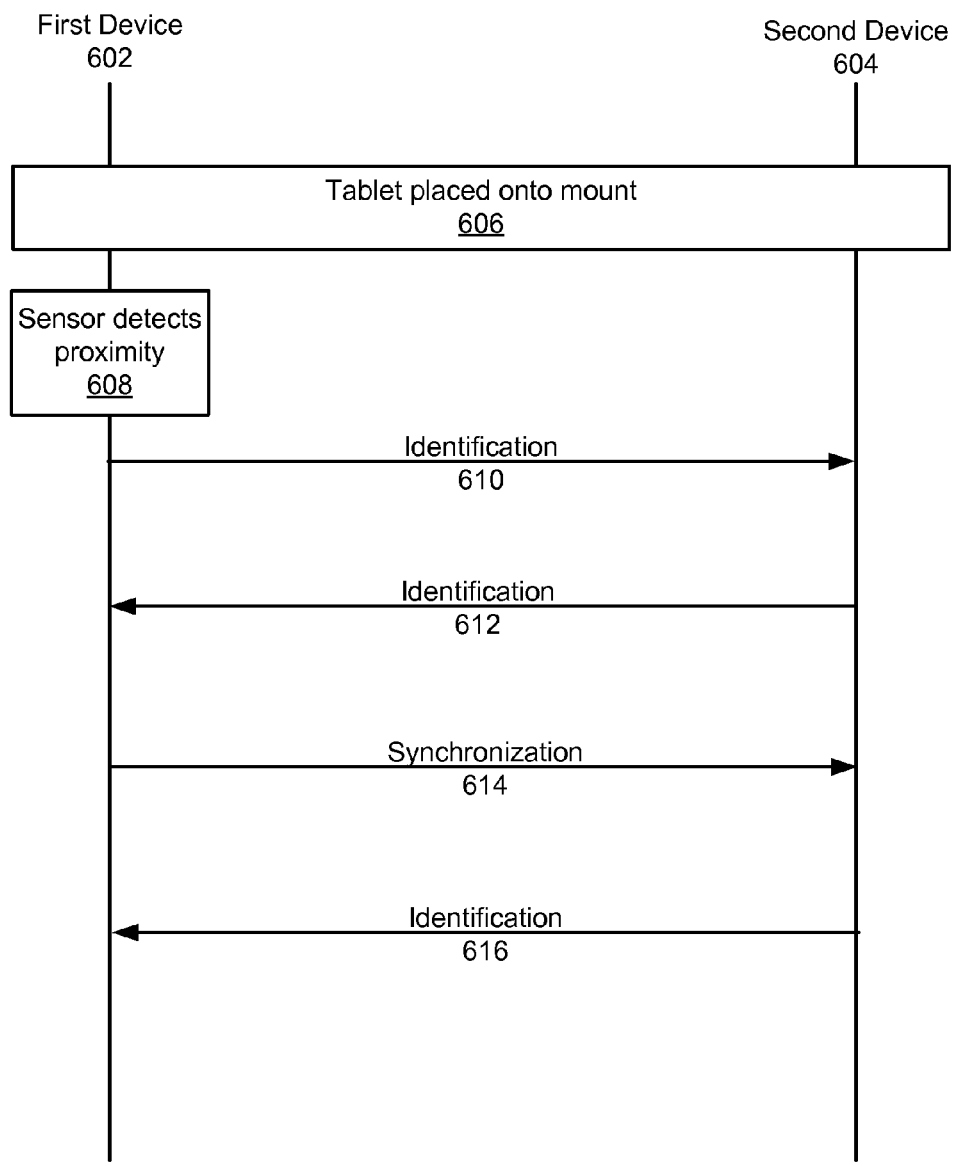
FIG. 6 is a timing diagram showing the tablet computing device and keyboard initiate communication according to an example embodiment.

FIG. 6 is a timing diagram showing the tablet computing device 102 and keyboard 112 initiate communication according to an example embodiment. In a first example, the first device 602 may represent the tablet computing device 102 and the second computing device 604 may represent the keyboard 112, whereas in a second example, the first device 602 may represent the keyboard 112 and the second device 604 may represent the tablet computing device 102.

The initiation of communication may begin with the tablet computing device 102 being placed onto the mount 114 (606). Based on the tablet computing device 102 being placed onto the mount 114, a sensor of the first device 602 may detect proximity of the second device 604 (608). The sensor of the first device 602 that detects proximity of the second device 604 may be the sensor 292 included in the mount 114 or the communication sensor 570 included in the tablet computing device 102. The sensor of the first device 602 may detect the proximity of the second device 604 by detecting a magnetic field generated by a magnet included in the second device 604, according to an example embodiment.

In the example shown in FIG. 6, in which the first and second devices 602, 604 are aware of and/or have stored each other's hardware addresses, the first device 602 may, after detecting the proximity of the second device (608), send an identification packet 610 to the second device 604. The identification packet 610 may include an identification, such as a Medium Access Control (MAC) address, of the first device 602 and/or second device 604. The second device 604 may respond to receiving the identification packet 610 from the first device 602 by sending an identification packet 612 to the first device 602. The identification packet 612 may include an identification, such as a MAC address, of the second device 604 and/or first device 602.

The first device 602 may respond to receiving the identification packet 612 from the second device 604 by sending a synchronization packet 614 to the second device 604. The synchronization packet 614 may include a map of a schedule for communication and/or transmission of signals between the first device 602 and the second device 604. In an example of a frequency hopping spread spectrum communication protocol such as Bluetooth, the synchronization packet 614 may include a frequency hopping synchronization (FHS) packet. The second device 604 may respond to receiving the synchronization packet 614 by sending an identification packet 616 confirming the synchronization included in the synchronization packet 614. The first and second devices 602, 604 may thereafter communicate with each other wirelessly, such as by the keyboard 112 sending keystroke signals and/or other user input signals to the tablet computing device 102. While the initiation of communication has been described as being similar to a Bluetooth paging sequence, other protocols may be performed by the first and second devices 602, 604 to initiate communication between the first and second devices 602, 604.

Figure 7:
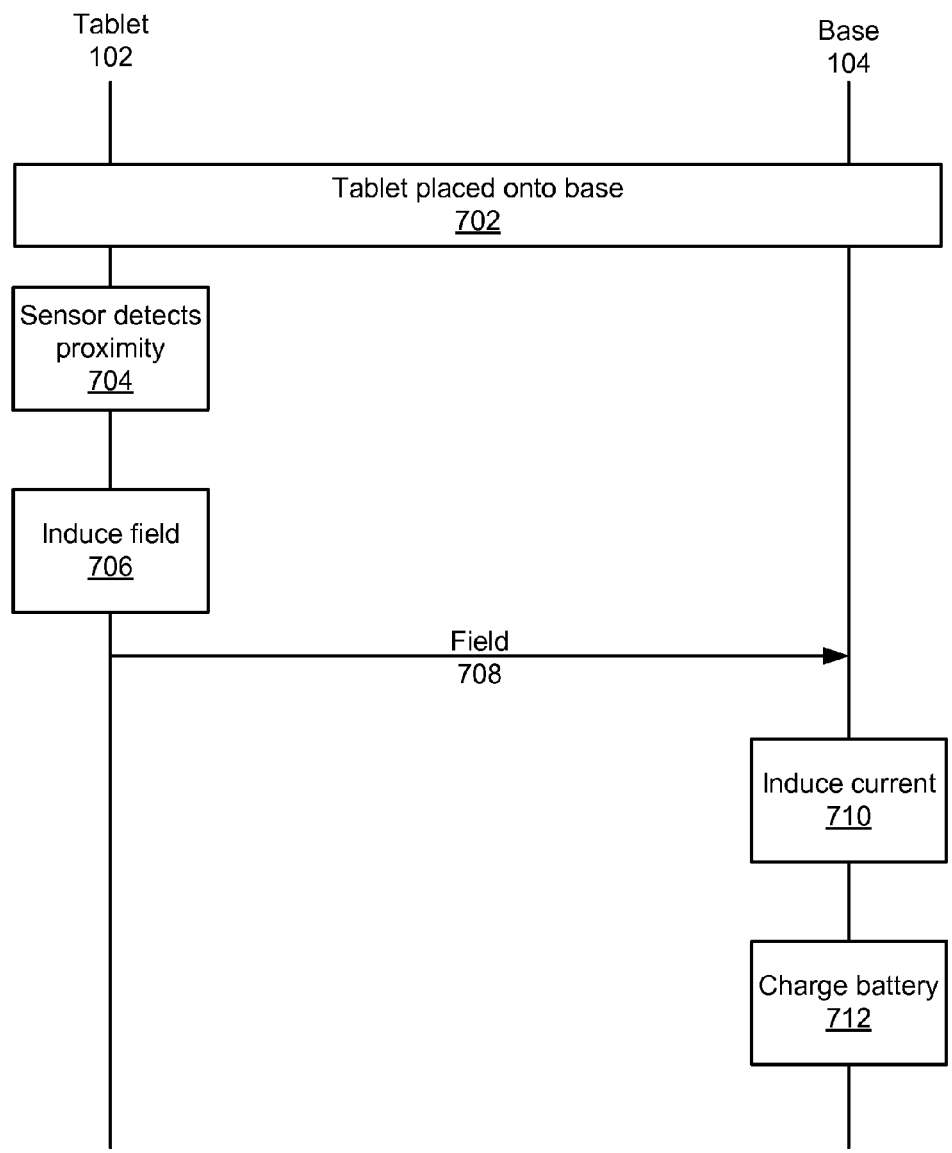
FIG. 7 is a timing diagram showing the tablet computing device charge the keyboard according to an example embodiment.

FIG. 7 is a timing diagram showing the tablet computing device 102 charge the keyboard 114 according to an example embodiment. In this example, the tablet computing device 102 may be placed onto the base 104 (702). The tablet computing device 102 may be placed face-down onto the base 104, with the display 108 facing the base 104, as shown in FIG. 1B. The tablet computing device 102 may be placed onto the base 104 so that the charging coil 560 of the tablet computing device 102 is aligned with the charging coil 284 of the keyboard 112. The magnets in the corners of the tablet computing device 102 and the base 104 may also align, retaining the tablet computing device 102 to the base 104.

Based on, and/or in response to, the tablet computing device 102 being placed onto the base 104 (702), the charging sensor 464 of the tablet computing device 102 may detect the proximity of the keyboard 112 and/or base 104 (704). The charging sensor 464 of the tablet computing device 102 may detect the proximity of the keyboard 112 and/or base 104 based on detection of a magnetic field created by a magnet in the keyboard 112 and/or base 104, according to an example embodiment.

Based on detecting the proximity of the keyboard 112 and/or base 104, the tablet computing device 102 may induce a magnetic field (706). The tablet computing device 102 may induce the magnetic field (706) by, for example, causing a current to flow through the charging coil 560. A magnetic field 708 induced by the tablet computing device 102 may extend into and/or through the base 104, keyboard 112, and/or charging coil 284.

The magnetic field 708 may induce an electrical current in the charging coil 284 of the keyboard 112 (710). The keyboard 112 may charge and/or recharge the battery 408 based on the current induced by the magnetic field 708 (712).

Figure 8:
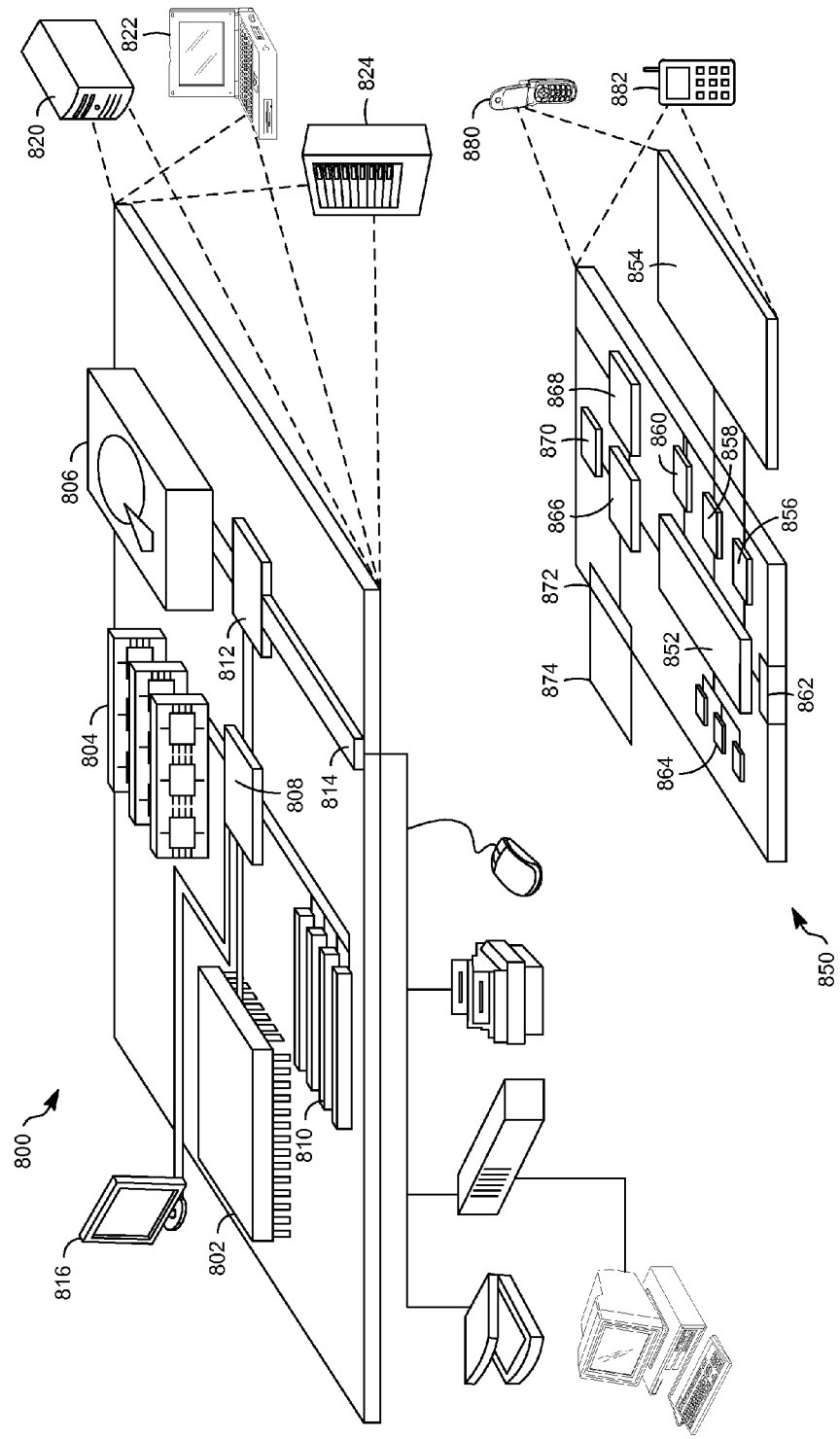
FIG. 8 shows an example of a generic computer device and a generic mobile computer device, which may be used with the techniques described here.

FIG. 8 shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, tablet computing device 102, base 104, keyboard 112, and/or other appropriate computers. Computing device 850 is intended to represent various forms of mobile devices, such as personal digital assistants, cellular telephones, smart phones, tablet computing device 102, base 104, keyboard 112, and/or other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:
1. A base comprising:
a frame;
a keyboard enclosed by the frame, the keyboard being configured to wirelessly communicate with a computing device;
a mount hingedly attached to the frame by at least one friction hinge, the mount comprising:
a first column of magnets extending in a first direction, the first direction being generally perpendicular to an axis of rotation of the mount about the frame; and
a row of magnets extending in a second direction, the second direction being generally parallel to the axis of rotation of the mount about the frame; and
a torsion spring applying torque to the friction hinge in a direction to reduce torque required to rotate the mount in a direction that increases an angle θ between the mount and a plane, the plane extending from the friction hinge away from the keyboard in a direction parallel to an extension of the frame from the friction hinge.

2. The base of claim 1, wherein the mount has a rectangular planar shape.

3. The base of claim 1, wherein the at least one friction hinge has a first friction in a first direction that is greater than a second friction in a second direction.

4. The base of claim 1, wherein the mount includes at least a first magnet in a first corner portion of the mount and a second magnet in a second corner portion of the mount.

5. The base of claim 1, further comprising:
a sensor included in the mount,
wherein the base is configured to initiate wireless communication with the computing device in response to the sensor detecting proximity of the computing device.

6. The base of claim 1, further comprising a sensor, the sensor being configured to detect a proximity of a magnet in the computing device and prompt the keyboard to power on.

7. The base of claim 6, wherein the sensor includes a hall-effect sensor.

8. A base comprising:
a frame;
a keyboard enclosed by the frame, the keyboard being configured to wirelessly communicate with a computing device;
a mount hingedly attached to the frame, a location at which the mount is hingedly attached to the frame being at least one fifth of a depth of the frame away from a rear portion of the frame, the mount comprising:
a first column of magnets extending in a first direction being generally perpendicular to an axis of rotation of the mount about the frame; and
a second column of magnets extending in the first direction; and
a torsion spring applying torque to the mount in a direction to reduce torque required to rotate the mount away from the rear portion of the frame.

9. The base of claim 8, wherein the mount is hingedly attached to the frame by at least one friction hinge.

10. A base comprising:
a frame;
a keyboard enclosed by the frame, the keyboard being configured to wirelessly communicate with a computing device; and
a mount hingedly attached to the frame, the mount comprising:
a first column of magnets extending in a first direction, the first direction being generally perpendicular to an axis of rotation of the mount about the frame;
a second column of magnets extending in the first direction; and a row of magnets extending in a second direction, the second direction being generally parallel to the axis of rotation of the mount about the frame.

11. The base of claim 10, wherein the row of magnets is closer to the keyboard than to an end portion of the frame opposite from the keyboard.

12. A tablet computing device comprising:
a display;
a housing enclosing the display, the housing having a length in a first direction and a width in a second direction, the width being greater than the length;
a first column of magnets extending in the first direction from a lower end portion of the housing;
a second column of magnets extending in the first direction from the lower end portion of the housing; and
a row of magnets extending in the second direction in the lower end portion of the housing.

13. The tablet computing device of claim 12, wherein the first column of magnets extends less than half the length of the housing from the lower end portion of the housing and the second column of magnets extends less than half the length of the housing from the lower end portion of the housing.

14. A system comprising:
a base comprising:
  a frame;
  a keyboard enclosed by the frame, the keyboard being configured to wirelessly communicate with a tablet computing device; and
  a mount hingedly attached to the frame, the mount comprising:
    a first base column of magnets extending in a first direction, the first direction being generally perpendicular to an axis of rotation of the mount about the frame;
    a second base column of magnets extending in the first direction; and
    a base row of magnets extending in a second direction, the second direction being generally parallel to the axis of rotation of the mount about the frame; and
a tablet computing device comprising:
  a display;
  a housing enclosing the display, the housing having a length in the first direction and a width in the second direction, the width being greater than the length;
  a first tablet column of magnets extending in the first direction from a lower end portion of the housing and aligned with the first base column of magnets;
  a second tablet column of magnets extending in the second direction from the lower end portion of the housing and aligned with the second base column of magnets; and
  a tablet row of magnets extending in the second direction from the lower end portion of the housing and aligned with the base row of magnets.

15. The system of claim 14, wherein:
the mount extends from the frame at an angle between twenty and eighty degrees; and
the tablet extends through a plane that is perpendicular to the frame and extends along an end portion of the frame that is opposite from the keyboard.

16. The system of claim 14, wherein the mount is hingedly attached to the frame at a location sufficiently far from an end portion of the frame opposite from the keyboard to prevent the system from tipping along an axis at the end portion of the frame opposite from the keyboard.

* * * * *

UNITED STATES PATENT AND TRADEMARK OFFICE
CERTIFICATE OF CORRECTION

PATENT NO. : 9,600,034 B2  
APPLICATION NO. : 14/622330  
DATED : March 21, 2017  
INVENTOR(S) : Kiple et al.

Page 1 of 1

It is certified that error appears in the above-identified patent and that said Letters Patent is hereby corrected as shown below:

In the Claims

In Column 18, Lines 46-47, Claim 8, delete "direction being" and insert -- direction, the first direction being --, therefor.

Signed and Sealed this  
Eleventh Day of July, 2017

Joseph Matal  
*Performing the Functions and Duties of the*  
*Under Secretary of Commerce for Intellectual Property and*  
*Director of the United States Patent and Trademark Office*